United States Patent Office 3,076,194
Patented Jan. 29, 1963

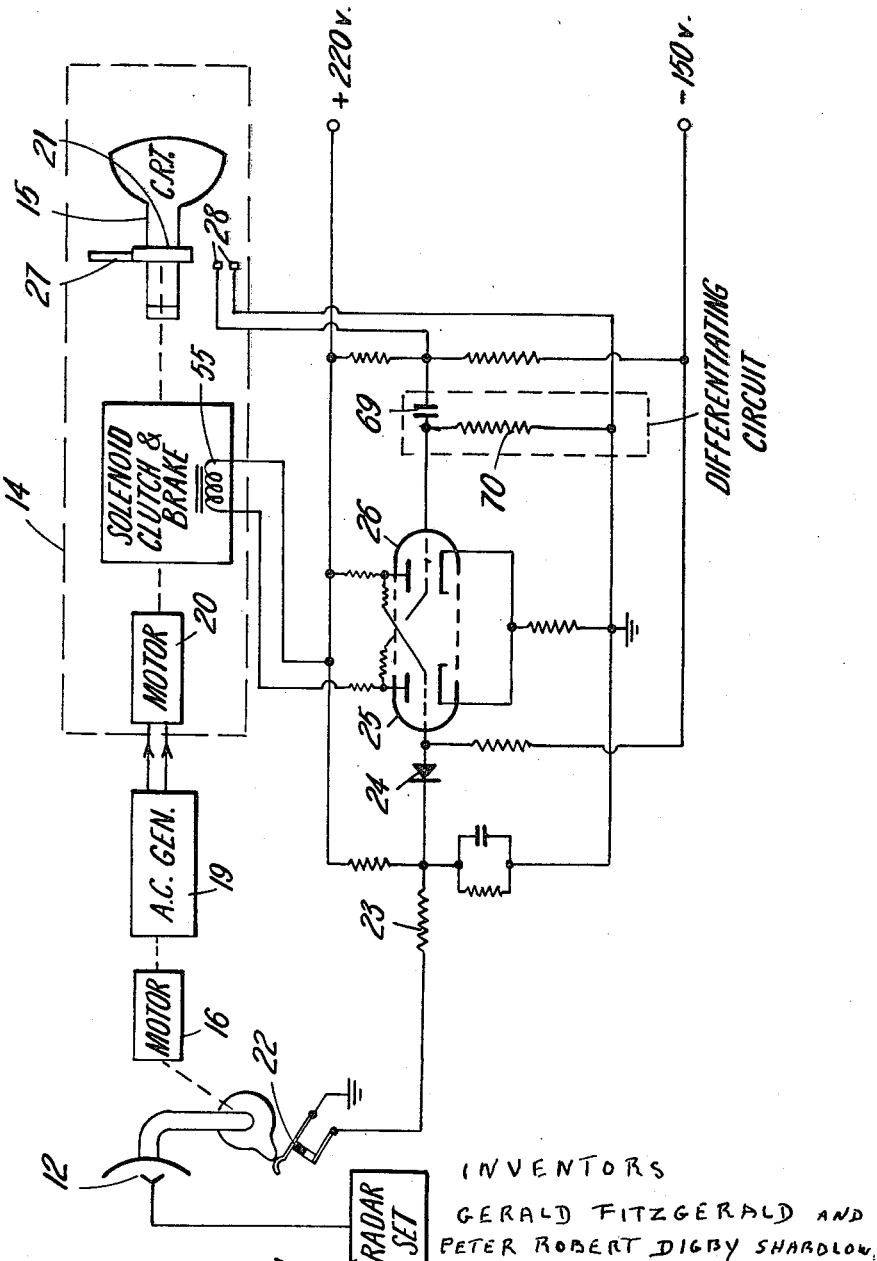

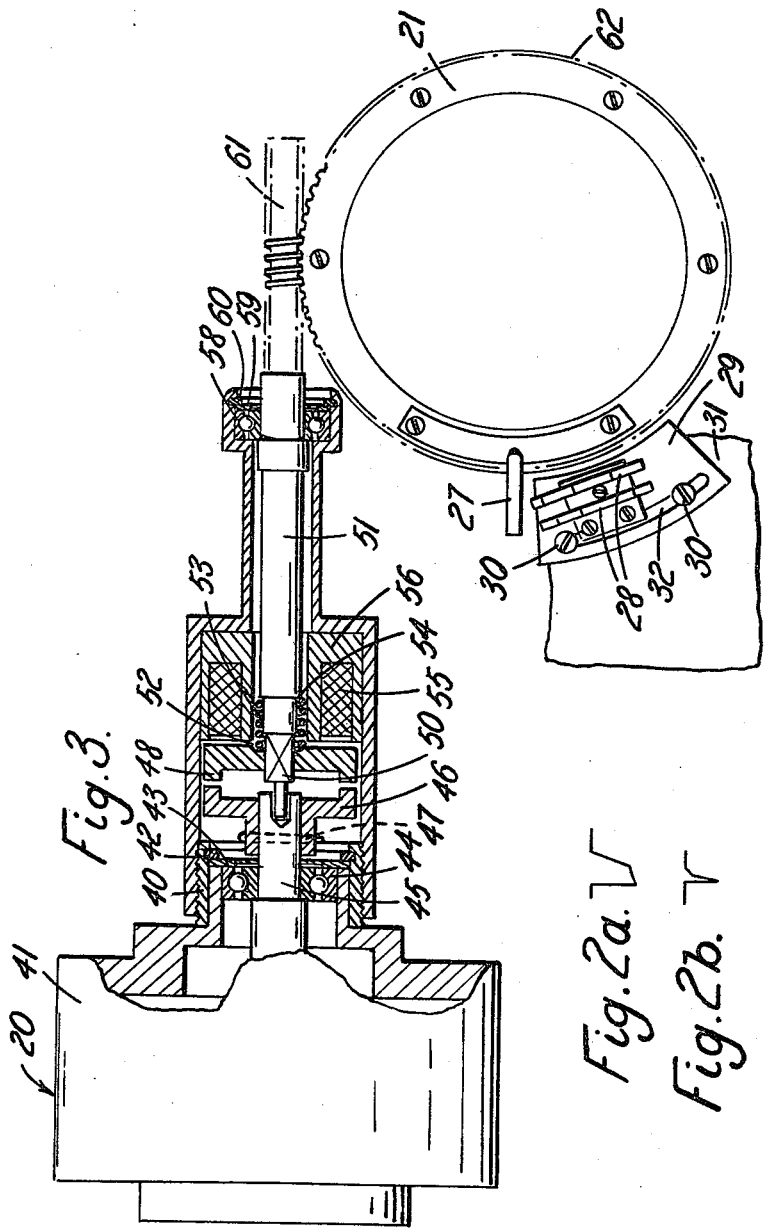

3,076,194
REMOTE CONTROL APPARATUS
Gerald Fitzgerald and Peter Robert Digby Shardlow, London, England, assignors to Decca Limited, a British company
Filed Dec. 28, 1960, Ser. No. 78,907
Claims priority, application Great Britain Dec. 28, 1959
15 Claims. (Cl. 343—118)

This invention relates to remote position control apparatus in which a rotatable follower element is driven by a motor in synchronism with the rotation of a continuously rotating member and has for its principal object to provide improved means for automatically making the angular position of the follower element correspond exactly with the angular position of said continuously rotating member.

The invention is particularly applicable to radar apparatus having a continuously rotating antenna and having a plan position indicator. The indicator may be of the rotating coil type, in which case it is necessary to drive the deflection coil holder in synchronism with the antenna and to have the deflection coil holder properly aligned with the antenna. Alternatively, the indicator may be of the fixed coil type, in which case it is necessary to drive a resolver in syncronism with the antenna and properly aligned therewith.

According to this invention, in remote position control apparatus in which a rotatable follower element is driven by a motor synchronously with the rotation of a continuously rotating member, there are provided a first electrical switch contact arranged to be operated by said continuously rotating member at one point in the cycle of the rotation thereof, a second electrical switch contact arranged to be operated by said follower element at one point in the cycle of rotation thereof, a bi-stable circuit, means for feeding each pulse from the first switch to the bi-stable circuit to set it in one condition, means for feeding each pulse from the second switch to the bi-stable circuit to set it in the other condition, and a clutch in the drive from said motor to said follower element controlled by the bi-stable circuit so as to be engaged when the bi-stable circuit is in said one condition and disengaged when the bi-stable circuit is in said second condition. As indicated above the invention is particularly applicable to plan position radar apparatus in which a directional antenna constitutes said continuously rotating member and in which a rotatable element controlling the angular position of the display trace constitutes the rotatable follower element.

Preferably, the pulse from the first said switch is made of larger amplitude and longer duration than the pulse from the second switch, so that, if the two pulses coincide in time, the pulse from the second switch has no effect on the bi-stable circuit which remains in the condition set by the pulse from the first said switch, thereby ensuring no change whatsoever in the circuit. Alternatively, the pulse from the first said switch may be made to override the pulse from the second said switch by other suitable means. If the pulses do not coincide, however, the pulse from the second switch will set the bi-stable to its second condition, thereby interrupting the drive to the rotatable element until the first switch next operates. It will be seen that the drive motor runs continuously and the clutch is engaged as soon as the proper angular alignment is reached.

The bi-stable circuit is preferably arranged so that when the clutch is disengaged, a brake is applied to said rotatable element or to the drive thereof and conveniently the clutch mechanism comprises a first clutch member driven by the motor and a second axially movable clutch member driving said rotatable follower element, which movable clutch member is electromagnetically controlled so that in one position it engages the first clutch member to complete the drive and, when shifted axially, is attracted to and is held by a magnetic braking coil which prevents rotation of the second clutch member and hence of said rotatable element.

In the case of radar apparatus, the first switch may conveniently comprise a heading marker switch or azimuth alignment switch such as is commonly provided in radar apparatus to brighten the radar display trace when the antenna passes through a particular azimuth or heading. The second switch may be operated directly by the rotatable element controlling the position of the radar display trace, for example the rotatable deflection coil holder in a rotatable deflection coil system. A switch operating cam may be arranged on this rotatable element or, in one convenient arrangement, an electrically conductive member is mounted on this rotatable element which member is arranged to bridge a pair of contacts carried on a fixed part of the display apparatus as the rotatable element is turned so that an electrical circuit is completed once in each revolution of the aforesaid rotatable element, thereby providing the required pulse. The two fixed contacts may be adjustably mounted for movement angularly about the axis of rotation of the rotatable element whereby the point in the cycle of movement of the rotatable element at which the circuit is completed may be adjusted. The aforementioned second switch may have contacts which are closed to complete a circuit and, in this case, the output from these contacts may be fed through a differentiating circuit to give a short duration pulse so as to ensure that this pulse is shorter than the pulse from the first switch.

In one form of construction of drive system for the rotatable deflection coil held for plan position radar display, an asynchronous starting synchronous motor is secured to one clutch plate, the motor being energised from an alternating current generator driven from the antenna, the generator providing an output at a frequency which is a multiple of the speed of antenna rotation. A second clutch plate, which is axially movable, is made a sliding fit on and drivingly engages a spindle which in turn drives the deflection coil holder through a worm drive. The movable clutch plate is constructed of magnetic material and adjacent this plate, surrounding the drive spindle, is an electro-magnetic braking coil arranged, when energised, to attract the movable clutch plate and hence to move this clutch plate out of engagement with the clutch plate on the motor shaft. A spring is provided for holding the two clutch plates in engagement when the electromagnet is unenergised. The clutch plates have a number of teeth of very fine dimensions to ensure positive coupling and to prevent any slip between the two plates. To ensure that the electro-magnet does not affect the deflection of the cathode ray tube, the spindle extending from the second clutch plate to the worm drive is made of non-magnetic material.

The electro-magnet may conveniently be arranged as the anode load of one of two tubes constituting the aforementioned bi-stable circuit.

The following is a description of one embodiment of the invention, reference being made to the accompanying drawings in which:

FIGURE 1 is a diagram illustrating a radar apparatus and showing more particularly means for automatically making the angular position of the display trace correspond with the angular position of a rotating antenna;

FIGURES 2(a) and 2(b) are waveform diagrams showing waveforms at two points in the circuit of FIGURE 1; and FIGURE 3 is a view partly in section of the drive arrangement for a rotating coil system in a display for the radar apparatus of FIGURE 1.

Referring to the drawings, the radar apparatus is indicated diagrammatically at 11 and comprises a transmitter 10 which produces short duration pulses of microwave energy which are fed through a duplexer to a sharply directional antenna 12. The radiated pulses are reflected by distant targets to give echoes which are picked up by the antenna 12 and fed through the duplexer to a receiver and thence to a display unit 14 incorporating a cathode ray tube 15. The antenna 12 is continuously rotated by means of a motor 16. On the antenna drive shaft is secured a gear 17 which drives a pinion 18 on the shaft of the alternating current generator 19 so that the latter produces an output of a frequency which is a multiple of the frequency of rotation of the shaft. The alternating current output from the generator 19 is fed to an asynchronous starting synchronous motor 20 in the display unit 14 which motor drives a rotatable deflection coil holder 21 for rotating the trace to form a plan position display on the cathode ray display tube 15.

The radar apparatus thus far described may be of known construction and further description is therefore believed to be unnecessary. The present invention is concerned more particularly with automatically aligning the angular position of the display with the angular position of the antenna. On the antenna there is provided a switch 22 which closes each time the antenna passes through a particular direction. Such a switch may be similar in construction to a heading marker switch such as is commonly provided on marine radar or an azimuth alignment switch which may be provided on ground based radar and very conveniently the heading marker switch or azimuth alignment switch is utilised for the purposes of the present invention. One side of the switch is earthed and the other side is connected by a resistor 23 and a diode 24 to a control grid of a triode 25 which is one of a pair of triodes 25, 26 connected to form a bistable circuit. This bi-stable circuit is arranged so that the triode 26 is normally conductive and triode 25 is normally cut-off. The pulse from the switch 22 which occurs when the antenna passes through the particular angular direction at which the switch 22 closes forms one input to the bi-stable circuit and will be referred to as the "re-set" pulse. There is a second input to the bi-stable circuit, known as the "set" pulse, which is produced when a contact element 27 completes a circuit between two contacts 28 to apply an earth pulse through a capacitor 69 to the control grid of the triode 26.

The contact element 27 is shown in FIGURE 3 and is mounted on the rotatable deflection coil holder 21. This contact element completes a circuit between two metallic strips forming the contacts 28 these strips being arranged on a mount 29 which is secured by bolts 30 to a fixed part of the structure indicated diagrammatically at 31. The bolts 30 pass through an arcuate slot 32 in the plate 29 so that the position of the contact strips 28 is adjustable angularly through a small angle about the axis of rotation of the deflection coil holder 21.

A collar 40 (FIGURE 3) is a press fit on a front bearing plate 41 of the motor 20. This collar 40 has an annular groove in its inner face in which is located a circlip 42 which retains a washer 43, a bearing 44 and the spindle 45 of the motor 20 within the housing 41, the bearing engaging a shoulder on the spindle 45. A clutch plate 46 is fixed to the motor spindle 45 by a tapered pin 47. This clutch plate 46 co-operates with a second clutch plate 48 which is formed of steel or to which a ferro magnetic plate is secured. The clutch plates 46, 48 have a number of teeth of very fine dimensions cut in each plate to ensure positive coupling without slipping when the two plates are in engagement. The clutch plate 48 is a sliding fit on a square section portion 50 of a spindle 51. The clutch plate 48 has a recess 52 to accommodate a helical compression spring 53 which extends around part of the spindle between the backing plate 49 and a shoulder 54 on the spindle 51 so as normally to urge the clutch plate 48 into engagement with the motor-driven clutch plate 46. Located behind the clutch plate 48 is a brake coil 55 which, when energised, attracts this clutch plate to disengage it, against the spring action, from the motor-driven clutch plate 46. The spindle 51 is made from non-magnetic material so that the magnetic circuit of the brake coil 55 does not interfere with the magnetic circuit of the deflection coil of the cathode ray tube. The coil 55 is wound in a recess in a core 56 and the braking system is designed so that the pull of the electro-magnet constituted by coil 55 and core 56 when energised will overcome the spring force of the spring 53 to disengage the clutch plate 48 from the motor-driven clutch plate 46. The clutch assembly is arranged in a housing 57 which carries a bearing 58 retained in position by a washer 59 and a circlip 60. The spindle 51 drives a worm 61 engaging an annular gear 62 on the deflection coil assembly 21. The clutch housing 57 is threaded onto the aforementioned collar 40 on the end plate 41 of the motor 20 to permit of adjustment of the spacing between the clutch plates 46 and 48.

It will be seen that when the braking coil 55 is unenergised, the motor 20 drives the worm 61, so rotating the deflection coil assembly 21 and hence causing the contact element 27 to bridge the contacts 28 once per revolution. Referring to FIGURE 1, the pulse produced by these contacts when closed is differentiated by a short time constant circuit constituted by the aforementioned capacitor 69 and a resistor 70 to produce a relatively short duration "set" pulse at the grid of triode 26 as shown in FIGURE 2(b), this pulse being shorter than the "re-set" pulse at the grid of triode 25 produced by the switch contact 22 which "re-set" pulse is shown in FIGURE 2(a). The braking coil 55 is connected, as shown in FIGURE 1, in the anode circuit of the triode 25 so that the braking coil is energised when the triode 25 is conductive and is unenergised when that triode is cut off.

The system described above operates in the following manner. When the radar apparatus is switched on, the antenna 12 will rotate and the alternator 19 will energise the motor 20. The clutch plates 46, 48 will normally be in engagement under the pressure of the spring 53 so that the deflection coil is rotated, the rotation being in the clockwise direction as seen in FIGURE 3. As soon as the contact element 27 bridges the contact strips 28, the pulse is produced which is differentiated by the differentiating circuit 69, 70 to form said "set" pulse which will immediately cut off the triode 26 and cause the bistable circuit to change to the condition in which the triode 25 is conductive. The brake coil 55 is therefore energised and will stay energised so long as the bi-stable circuit remains in this condition. The clutch is therefore disengaged and a brake applied so that the deflection coil assembly no longer rotates, although the antenna 12 will continue to rotate. When the switch 22 closes, the "re-set" pulse will be applied to the grid of the triode 25. This will cut off the triode 25 and make the triode 26 conductive. The braking coil 55 will therefore no longer be energised and therefore the clutch plates 46, 48 will re-engage under the action of the spring 53 so that the deflection coil holder is now rotated being driven by the motor 20. The deflection coil will continue to move in synchronism with the rotating antenna and hence will continue in a proper alignment. During normal operation, the "set" and "re-set" pulses occur simultaneously. The "set" pulse is of shorter duration than the "re-set" pulse and its leading edge will be very slightly after the leading edge of the "re-set" pulse so that the "set" pulse occurs within the duration of the "re-set" pulse and will have no effect on the operation. In the event of the deflection coil in the antenna becoming out of alignment for any reason, the pulses will not coincide and the system will automatically re-align itself in the manner described above. The bolts 30 and slot 32 permit of fine adjustment in setting up to ensure the required angular relationship between the antenna and display trace is obtained. In the system described above it will be noted that the synchronous motor 20 driving the deflection coil holder does not materially change speed or stop during the automatic alignment process.

We claim:

1. Remote position control apparatus in which a rotatable follower element is driven by a motor synchronously with the rotation of a continuously rotating member wherein there are provided a first electrical switch contact arranged to be operated by said continuously rotating member at one point in the cycle of the rotation thereof, a second electrical switch contact arranged to be operated by said follower element at one point in the cycle of rotation thereof, a bi-stable circuit, means for feeding each pulse from the first switch to the bi-stable circuit to set it in one condition, means for feeding each pulse from the second switch to the bi-stable circuit to set it in the other condition, and a clutch in the drive from said motor to said follower element controlled by the bi-stable circuit so as to be engaged when the bi-stable circuit is in said one condition and disengaged when the bi-stable circuit is in said second condition.

2. Apparatus as claimed in claim 1 wherein said continuously rotating member is a directional antenna of a plan position radar apparatus and wherein said rotatable follower is a rotatable element controlling the angular position of a display trace in the radar apparatus.

3. Apparatus as claimed in claim 2 wherein the first switch comprises a heading marker switch or azimuth alignment switch.

4. Apparatus as claimed in claim 2 wherein said second switch is operated directly by the rotatable element controlling the angular position of the display trace.

5. Apparatus as claimed in claim 4 wherein a switch operating cam is arranged on said rotatable element for operating said second switch.

6. Apparatus as claimed in claim 4 wherein said second switch comprises an electrically conductive element mounted on said rotatable element, which conductive member is arranged to bridge a pair of contacts carried on a fixed part of the display apparatus as the rotatable element is turned so that an electrical circuit is completed once in each revolution of the rotatable element.

7. Apparatus as claimed in claim 6 wherein the two fixed contacts are adjustably mounted for movement angularly about the axis of rotation of the rotatable element whereby the point in the cycle of movement of the rotatable element at which the circuit is completed may be adjusted.

8. Apparatus as claimed in claim 1 wherein the pulse from the first switch is made of larger amplitude and longer duration than the pulse from the second switch, so that, if the two pulses coincide in time, the pulse from the second switch has no effect on the bi-stable circuit which remains in the condition set by the pulse from the first switch.

9. Apparatus as claimed in claim 4 wherein the pulse from the first switch is made of larger amplitude and longer duration than the pulse from the second switch, so that, if the two pulses coincide in time, the pulse from the second switch has no effect on the bi-stable circuit which remains in the condition set by the pulse from the first switch and wherein said second switch has contacts which are closed to complete a circuit and wherein the output from these contacts is fed through a differentiating circuit to give a short duration pulse.

10. Apparatus as claimed in claim 1 wherein the pulse from the first switch is made to override the pulse from the second switch if the two pulses coincide in time.

11. Apparatus as claimed in claim 1 wherein the bi-stable circuit is arranged so that, when the clutch is disengaged, a brake is applied to said rotatable element or to the drive thereof.

12. Apparatus as claimed in claim 11 wherein said clutch mechanism comprises a first clutch member driven by the motor and a second axially movable clutch member driving said rotatable follower element, which movable clutch member is electro-magnetically controlled so that in one position it engages the first clutch member to complete the drive and, when shifted axially, is attracted to and is held by a magnetic braking coil which prevents rotation of the second clutch member and hence of said rotatable element.

13. Apparatus as claimed in claim 12 wherein spring means are provided for holding said movable clutch member in said one position when said braking coil is unenergized.

14. Apparatus as claimed in claim 1 wherein said motor is an asynchronous starting synchronous motor, the motor being energized from an alternating current generator driven from said continuously rotating member, the generator providing an output at a frequency which is a multiple of the speed of rotation of said continuously rotating member.

15. Apparatus as claimed in claim 12 wherein said bi-stable circuit is formed by two tubes and wherein said braking coil is arranged to constitute the anode load of one of said two tubes.

References Cited in the file of this patent

UNITED STATES PATENTS

| | | |
|---|---|---|
| 2,444,796 | Whalley et al. | July 6, 1948 |
| 2,716,723 | King | Aug. 30, 1955 |

FOREIGN PATENTS

| | | |
|---|---|---|
| 577,796 | Great Britain | May 31, 1946 |